Dec. 27, 1938.  D. FRENCH  2,141,527
CUTTING MACHINE FOR SEED POTATOES
Filed Nov. 13, 1936  4 Sheets-Sheet 3
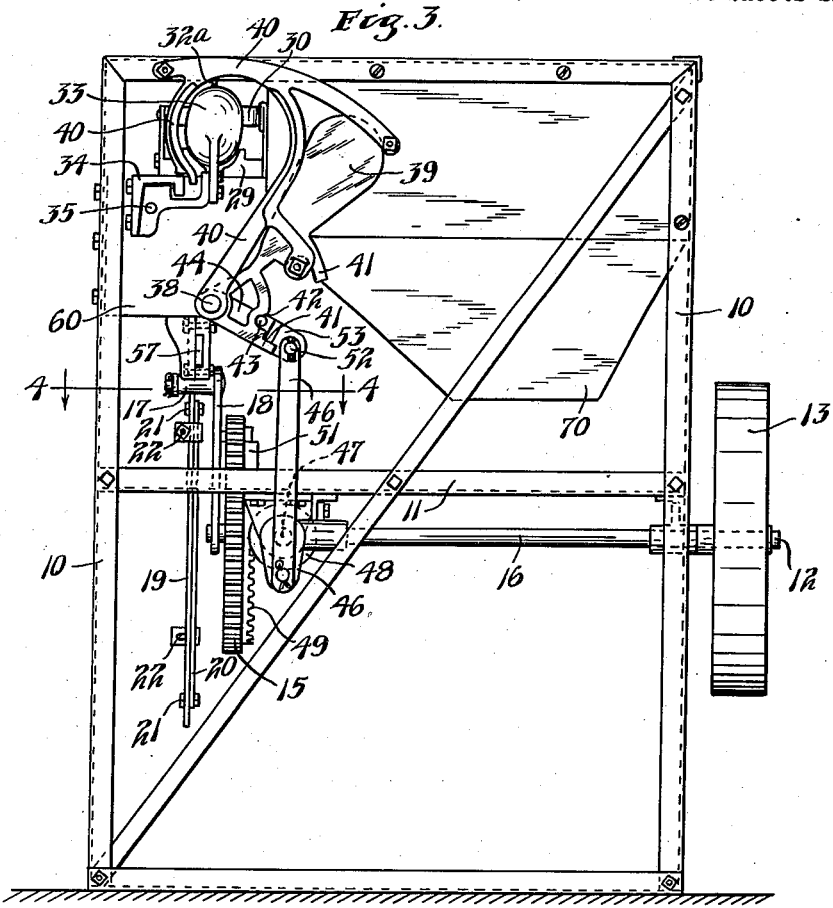
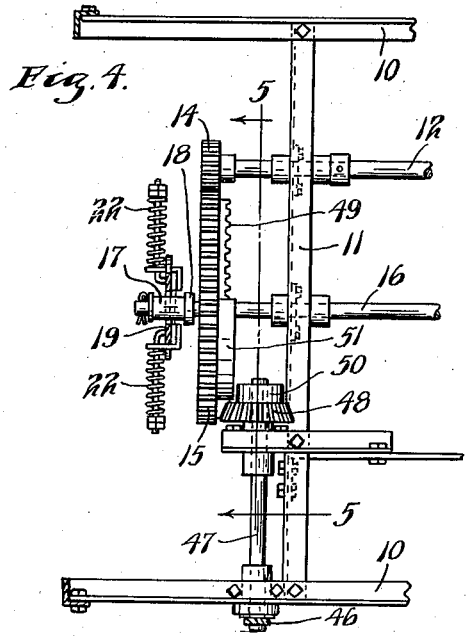
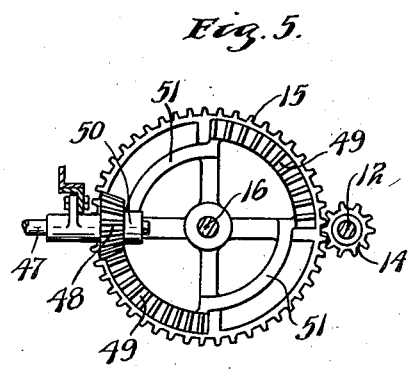
INVENTOR.
DAMAS FRENCH.
BY HIS ATTORNEYS.
Williamson & Williamson Dec. 27, 1938.　　　D. FRENCH　　　2,141,527
CUTTING MACHINE FOR SEED POTATOES
Filed Nov. 13, 1936　　　4 Sheets-Sheet 4

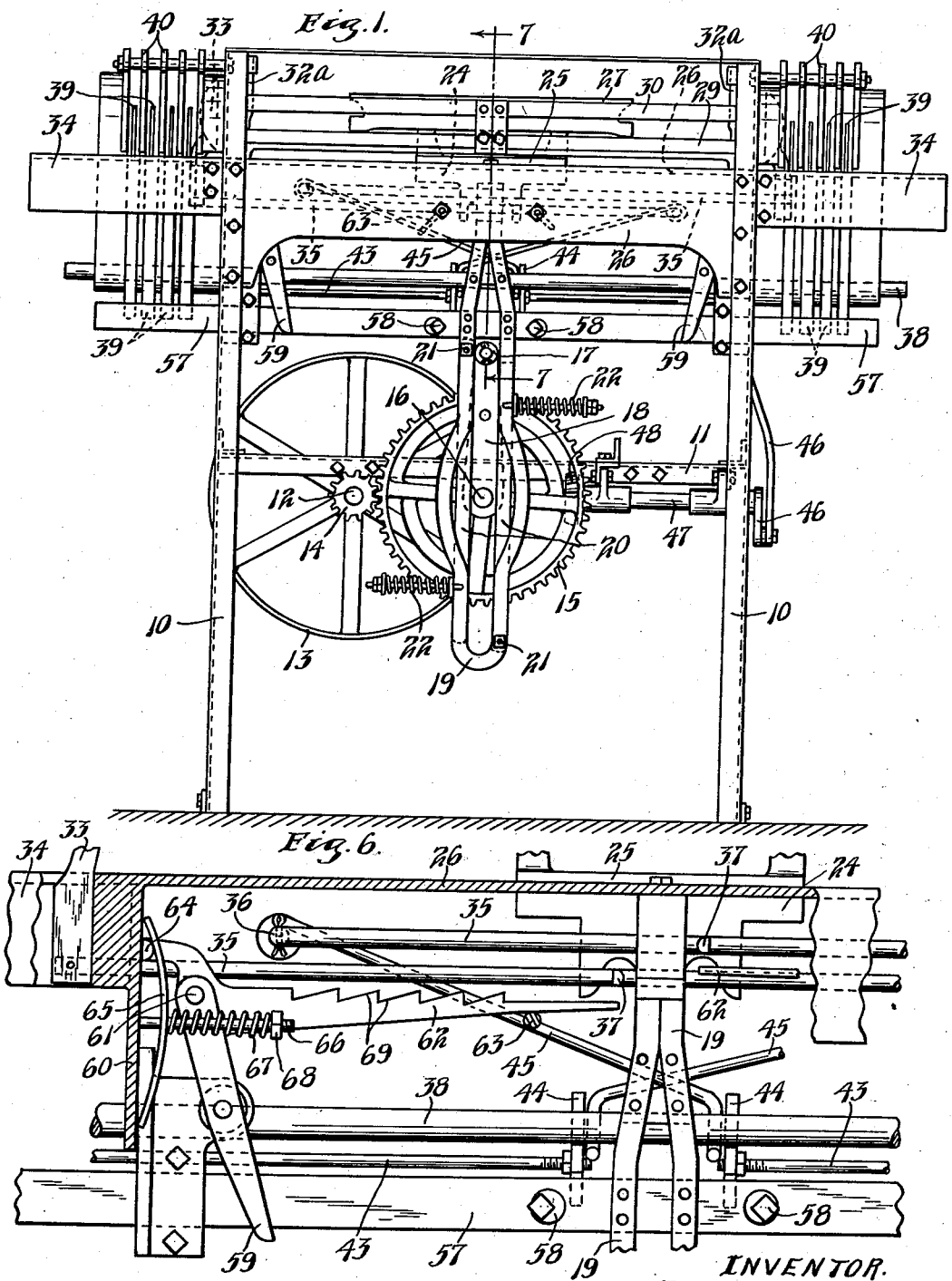

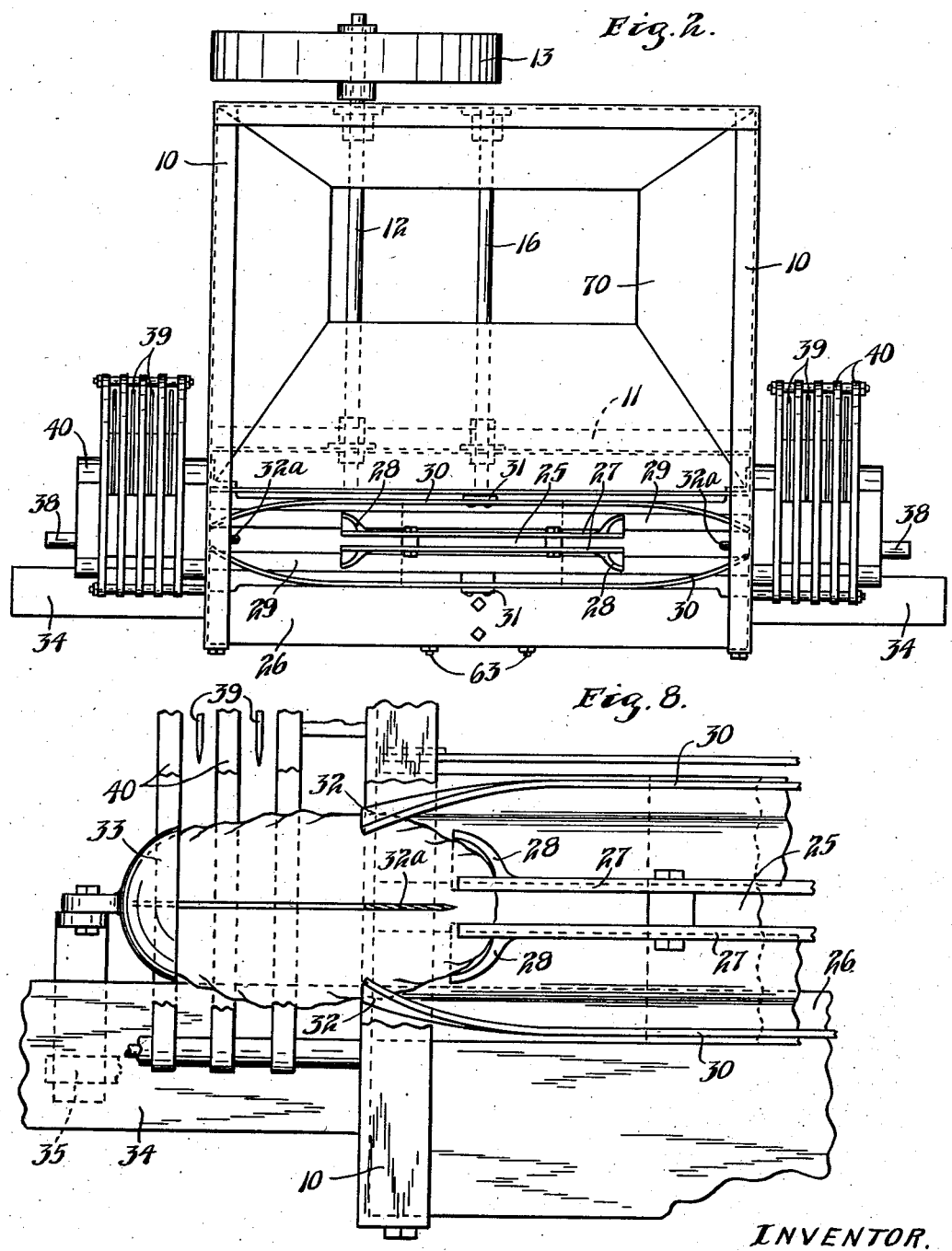

INVENTOR.
DAMAS FRENCH,
BY HIS ATTORNEYS.
Williamson & Williamson

Patented Dec. 27, 1938

2,141,527

UNITED STATES PATENT OFFICE 2,141,527

CUTTING MACHINE FOR SEED POTATOES

Damas French, Grafton, N. Dak.

Application November 13, 1936, Serial No. 110,605

5 Claims. (Cl. 146—78)

My invention relates to machines for cutting objects of irregular size and shape, and, more particularly, to machines for cutting seed potatoes.

In my prior Patent 1,954,870, dated April 17, 1934, I have disclosed a machine of this type which is automatic in operation and includes means for centering potatoes in front of cutting members in a manner which will provide uniformity of cut regardless of variations in sizes of the potatoes.

My present invention is directed generally to a machine of the type covered in the above identified patent. However, I have found that my machine will operate more efficiently and can be constructed more simply and economically according to the disclosure in the present invention. In addition, I have improved the construction and operation of my earlier device by providing a more positive action of the cutting mechanism.

These and other objects and advantages of the invention will be more fully set forth in the following description made in connection with the accompanying drawings, in which like reference characters refer to similar parts throughout the several views, and in which:—

Fig. 1 is a side elevation;

Fig. 2 is a top plan view with the cutters and potato propelling mechanism shown in inoperative position;

Fig. 3 is a side elevation;

Fig. 4 is a slightly enlarged section taken on line 4—4 of Fig. 3;

Fig. 5 is a similarly enlarged section taken on line 5—5 of Fig. 4;

Fig. 6 is an enlarged view of the automatic centering mechanism shown dotted in the upper left-hand portion of Fig. 1;

Fig. 8 is an enlarged view showing the position of a potato and the propelling mechanism at a point in the vertical longitudinal cutting operation.

Figure 7:
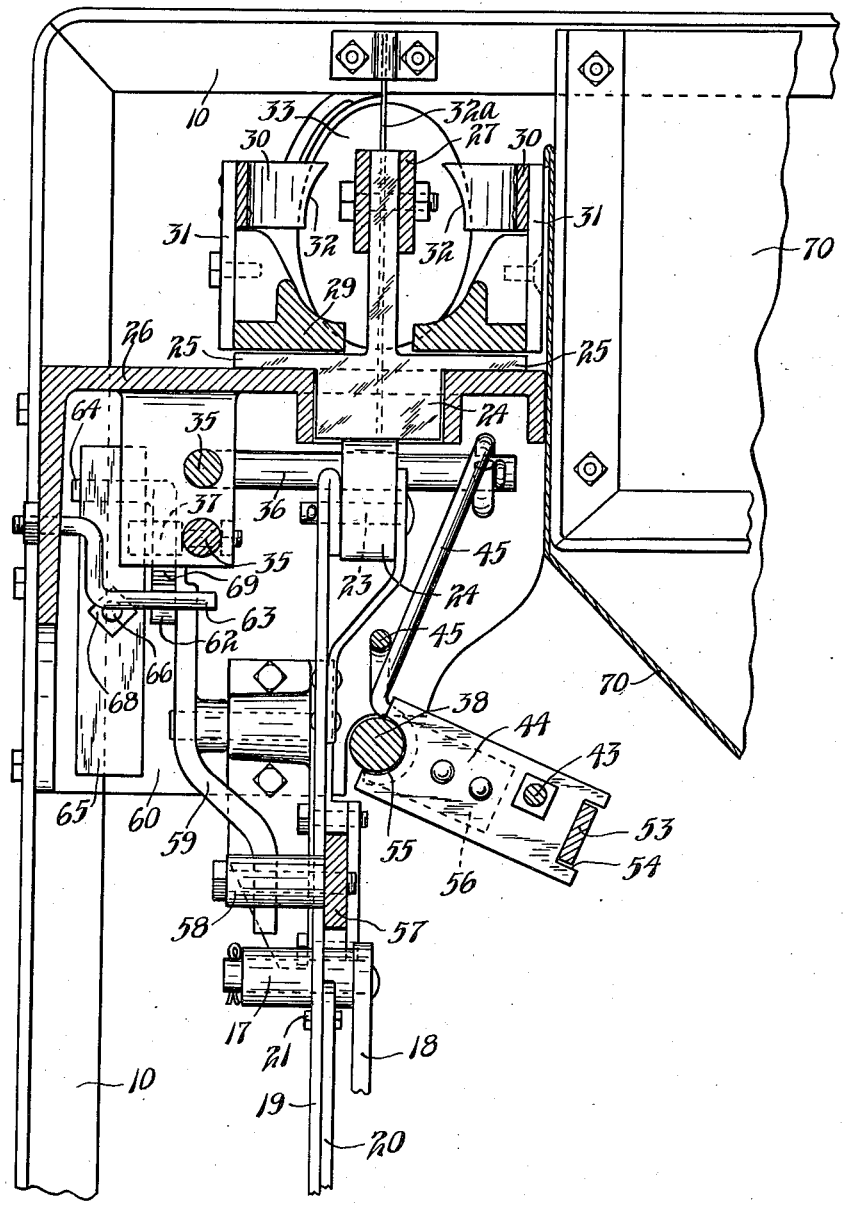
Fig. 7 is an enlarged section taken on line 7—7 of Fig. 1.

Referring to the drawings, the machine includes a framework, indicated at 10, having cross members 11 which carry a suitably journaled shaft 12. On the outer end of the shaft is a pulley 13 adapted to receive a power-driven belt, not shown.

The opposite end of the shaft 12 has secured thereon a gear 14 which meshes with the larger gear wheel 15 which is mounted for rotation on the horizontal shaft 16. A suitable cam member 17 is mounted on a crank bar 18 and is adapted to describe a circle when the geared wheel 15 is rotated. A trackway 19 is in the form of a U with parallel arms at its top and bottom portions. The central portions of these arms are curved outwardly away from each other. Co-operating with the arms of the U-shaped member and pivotally mounted thereon are straight flat bars 20 whose pivot points 21 are in opposite positions on the member 19. Suitable spring elements 22 are secured to the bars 20 to permit yieldable pivotal movement of said bars.

An extension of the U-shaped trackway 19 converges and is secured at 23 to the lower section of a slidable carriage 24. This carriage is provided with horizontally extending flanges 25 which run the entire length of said carriage and rest upon a base 26 which provides an upper cross member for the frame 10, and has a longitudinal slot therethrough to permit the above mentioned connection between the U-shaped trackway 19 and the carriage 24.

The upper portion of the carriage 24 carries a pair of longitudinally disposed object propelling bars 27 which have their ends shaped to provide cup-like members 28 adapted to receive a potato or other object to be cut. Spaced, slightly elevated longitudinal guide members 29 extend horizontally on either side of the carriage 24 and form, in conjunction with the upper face of the base 26 a guide for the flanges 25 and permit the carriage 24 to slide from side to side on said base. Additional guide members 30 are provided in the form of strips and are secured to supporting plates 31 at the central portion of said strips. These strips are of a resilient material and their ends converge toward each other and are bent over, as shown, at 32 and best illustrated in Figs. 7 and 8. Between the two sets of guide members, a vertically positioned knife 32a is provided to cut the potatoes longitudinally as they are being propelled, the object propelling bars passing on either side thereof. All of said guide members are substantially parallel and placed in spaced relation to permit free reciprocation of the carriage 24.

Outer potato engaging members 33 are shown slidably mounted in extensions 34 of the base 26, and are rigidly secured on slidable horizontal bars 35, the latter being mounted for sliding movement with respect to the base 26. The opposite ends of the bars 35 are turned at right angles, as at 36, and so positioned that reciprocation of the carriage 24 will cause engagement at said rightangled ends with the lower part of said carriage. Outstanding projections 37 are provided intermediately of the ends of the bar 36 for a purpose which will be described later.

A horizontal cutter supporting member 38, suitably secured to the framework 10 supports at its outer ends a series of cutters 39, which are pivotally mounted on said support. A series of curved guard members 40 are placed intermediately of said cutters and also function as spacing elements for the cutters, and in addition guide means therefor. Counterbalances 41 are provided at the lower and intermediate portions of said cutters and the lower counter-balances have semicircular notches 42 formed therein.

Cutter engaging bars 43 are slidably mounted in a horizontal position and secured at their inner ends to transverse plates 44, which are also connected by a suitable connecting link 45 to the right-angled ends of the rods 35 which are connected to the outer supporting elements 33. Reciprocation of the sliding rods 43 causes their outer ends to engage the notches 42 formed in the lower portions of the cutters 39.

In addition to the sliding movement of the cutter engaging bars 43, means is also provided for reciprocating them in an arc-like path to provide operating movement for the cutters 39 when this bar is in engagement with the notches 42 in the lower portions of the cutter. This movement is secured by means of a crank member 46 driven by rotation of the stub shaft 47 which has a gear 48 mounted on its outer end. The gear 48 is adapted to mesh with and be driven by gear segments 49 on the side of the geared wheel 15. At the extreme end of the stub shaft 47, a cam 50 is provided to co-operate with a smooth arc-shaped surface 51 on the side of the geared wheel 15 to hold the stub shaft 47 and gear 48 against rotation when the gear segments are not engaged thereby. The upper end of the crank member 46 is secured at 52 to one end of the cutter operating frame 53, which is mounted in parallel spaced relation to the cutter supporting bar 38 and is adapted to describe an arc with respect to said bar 38 when the crank member 46 is operated. The above mentioned cross plate 44 is provided at its ends with notches at 54 and 55 so that it will fit between the cutter supporting bar 38 and the cutter operating frame 53 in slidable relation to those members, and the connecting link 45 is bent under a clip 56 forming part of the cross plate 44 with the end of the link 45 so positioned between the members 44 and 56 that sliding movement of the cross plate 44 will be transmitted to the link 45 but reciprocation of the cutter operating frame 53 in an arc and consequent similar movement of the cross plate 44 will not be transmitted to said connecting link 45.

For properly positioning the carriage 24 and the outer cup-shaped holding member 33 with respect to the cutters a transverse arm 57 is secured near the upper end of the U-shaped trackway 19 and provided with eccentrically mounted contact members 58 which may be adjusted by turning to vary the distance from their outer faces to the center of the trackway 19. A substantially centrally pivoted lever 59 (best shown in Fig. 6) is secured to a depending flange 60 which forms part of the base member 26. The lever 59 is so positioned that one of the contact members 58 will strike its lower end when the trackway 19 and carriage 24 are reciprocated to one of their extreme outer positions. Pivoted at 61 to the upper end of the lever 59, is a toothed finger 62 whose outer end rests on a stop member 63 extending inwardly from the inner vertical face of the front portion of the base member 26. At its upper end, the finger 62 is extended beyond the pivot point 61 and provided with an inwardly turned end at 64 which rests behind the curved plate 65 and in operative position bears against the depending flange 60. This plate is slidably mounted on a bolt 66, whose inner end is fastened to the depending flange 60 of the frame 26. A helical spring 67 positioned between the curved plate 65 and a nut 68 on the free end of the bolt 66 normally holds the lever 59 and finger 62 in inoperative position, as shown in the drawings.

The finger 62 carries on its upper edge a plurality of teeth 69 which are adapted to engage the lug 37 on the supporting bar 35 for the outer potato engaging member 33, which will move outwardly when a potato propelled by the carriage 24 engages said outer holding member. The teeth 69 are spaced apart a distance directly proportionate to the distance between the cutters 39 and function to properly position a potato with respect to said cutters in a manner which will be described later.

The guard members 40 are curved substantially around the operating area of the cutters 39 in such a manner that their outer ends assist in holding a potato while it is being cut. The shape of the guard members is best shown in Fig. 3.

A suitable hopper 70 is provided to hold potatoes so that they can be fed into the machine.

In operation, when the shaft 12 is rotated by a force applied to the pulley 13 the geared wheel 15 and the crank 18 will be rotated. The cam member 18 will bear against one side of the trackway 19 causing it and the carriage 24 to describe a horizontal reciprocating motion. A potato which has been placed in contact with the cup-shaped member 28 forming part of said carriage will be propelled to one side of the machine while resting on the lower guide members 29 and between the flexible guide members 30. At a point substantially in a line with the vertically disposed knife 32a, the resilient guide members 30 prevent the potato from describing any possible upward movement because of their bent over ends 32. The carriage 24 will continue to move to one side causing the potato to engage the outer cup-shaped member 33 and push it outwardly, the spaced members 27 which form part of the carriage 24 will then be straddling the vertical knife 32a.

When the trackway and carriage have moved substantially to their farthest point of reciprocation, the contact members 58 will engage the lower end of the pivoted lever 59, causing the opposite end of the lever to move inwardly, carrying with it the toothed finger 62. As the toothed finger 62 moves inwardly, its end 64 will be free from contact with the depending portion 60 of the frame cross member 26 and the curved plate 65 urged by the helical spring 67 will act upon said end 64 of the toothed finger closing the opposite end of said finger to move upwardly. Engagement of the potato with the outer cup-shaped holding member 33 causes its supporting bar 35 to move outwardly with the potato bringing the lug 37 on said bar 35 into engagement with one of the teeth 69 on the finger 62.

At this point the operation of my automatic centering mechanism comes into play. If it were not for this mechanism, potatoes which might be of a generally similar size, but which might vary in longitudinal measurement a half or three-quarters of an inch, would be cut in such a manner that one end might be comparatively thick and the other end may be cut off in a very thin slice, if a positive non-centering stop mechanism was used. However, when the contact member 58 moves with the trackway 19 and carriage 24 to a point where contact is made with the lower end of the lever 59 and movement of the contact member is continued, this movement transmitted through the lever 59 to the toothed finger 62 will cause said finger to move in an opposite direction to the carriage 24 and the outstanding projections 37 on the slidable horizontal bar connected to the outer potato engaging member 33. Since the lever 59 is centrally pivoted, it will cause the finger 62 to move in such opposite direction a distance equal to that traveled by the carriage 24 after the contact member 58 has engaged said lever. In other words, if a potato is introduced which is one-half inch less in longitudinal measurement than the potato immediately preceding it on the same side of the machine, it would be necessary to move said carriage one-quarter inch further outward and also to move said outer potato engaging member inward one-quarter inch in order that the half inch difference in measurement between the two potatoes shall be distributed equally at each end of the potato. Of course, if there is too great a difference in measurement between one potato and the next succeeding one, these large differences in measurement will first be provided for by the arrangement of a plurality of such toothed members on the finger 62, but regardless of which tooth comes into contact with the outstanding projection 37 to stop the carriage and the outer engaging member, the centering mechanism will always operate. To provide means for initially setting the machine so that the centering device will function properly, it will be noted that the contact members 58 are placed eccentrically in order that the distance traveled by the carriage 24 before making contact may be varied slightly.

Due to the fact that the carriage 24 does not always travel the same distance, the trackway 19 is bowed outwardly in its central portion to permit the cam 17 to travel its greatest distance when in a horizontal position. If the trackway itself has been stopped before the cam has reached its maximum lateral or horizontal position, said cam will bear against the straight bars 20 and the springs to which they are connected will permit said bars to yield slightly.

After a potato has been propelled by the carriage, cut longitudinally by the knife 32a and properly centered with respect to the cutters 39, the small gear 48 will then be in a position to mesh with one of the gear segments 49 on the geared wheel 15 causing operation of the crank member 46 of the cutter operating frame 53, the cutter engaging bar 43 having moved with the carriage 24 causing the engagement of only so many cutters as are needed for the size of the potato being cut. With the operation of the crank member 46, the cutter engaging bar, which is mounted on the cutter operating frame 53, will cause the cutters so to engage to swing forward and cut the potato. Just as the cutting of the potato actually begins, the carriage 24 starts to withdraw from engagement with said potato and the outer engaging member will also move slightly away from the potato so that it will fall free when the cutting has been completed. Since the potato holding members have been withdrawn from engagement therewith, the substantially lateral movement of the cutters against one side of the potato will cause the other side of said potato to frictionally engage the inner faces of the curved ends of the guard members 40, where it will be held until the cutting is completed.

Continued movement of the cutter operating crank 46, will cause the cutters to be returned to their inoperative position, since the cutter engaging bar 43 is still in engaged position.

As the carriage 24 continues its movement away from the set of cutters, which have just operated and returned to their inoperative positions, the lower section of said carriage will engage the ends of the bars connected to the outer potato supporting member and cause said member to be drawn inwardly in position to be contacted by the next potato which is fed into that section of the machine, and the cutter engaging bar 43 will be moved out of engagement with said cutters.

It will, of course, be understood that various changes may be made in the form, details, arrangement and proportions of the apparatus without departing from the scope of my invention.

What I claim is:—

1. In a machine for cutting seed potatoes and the like, a power transmission element comprising a cam member and segmental gear members, sets of cutters, means for automatically selecting cutters of a set, means operated by said cam member for propelling and centering an object in cutting position alternately in the path of movement of automatically selected cutters of a set, and means operated by said segmental gear for alternately moving the sets of cutters through the object to cut the object into a plurality of pieces.

2. In a machine for cutting seed potatoes and the like, sets of cutters, a power operated member adapted for continuous rotary movement, a cam mounted on said power operated member, a yieldable trackway for said cam adapted to reciprocate when influenced by said cam, a reciprocating carriage connected to said yieldable member, means on said carriage for engaging an object to be cut, additional means for engaging the object in front of said cutters, and means for alternately operating said sets of cutters.

3. In a machine for cutting seed potatoes and the like, a series of spaced power operated cutters, reciprocating means for engaging and moving an object into the path of said cutters, slidably mounted means for engaging said object and stopping it in cutting position, and means for automatically centering said object, said centering means including a substantially centrally pivoted lever positioned for contact at one end with said reciprocating object engaging and moving means, a toothed element pivotally connected to the opposite end of said lever and adapted to engage said slidably mounted object engaging and stopping means, the teeth on said element being spaced in definite relation to the spacing of said cutters.

4. In a machine for cutting seed potatoes and the like, a series of spaced power operated cutters, reciprocating means for engaging and moving an object into the path of said cutters, slidably mounted means for engaging one end of said object, and means for automatically centering said engaging means and object, said centering means comprising a centrally pivoted lever, a contact member associated with said reciprocating means and adapted to engage one end of said lever, a finger pivoted to the opposite end of said lever, a series of teeth on said finger spaced in direct relation to the spacing of said cutters, means associated with said slidably mounted object engaging means adapted for engagement by one of said teeth, and spring means associated with said toothed finger to return it to inoperative position.

5. In a machine for cutting seed potatoes and the like, a series of cutters, means for propelling an object to be cut into the operative area of said cutters, means for centering said object with respect to said cutters, and drive means for said cutters and propelling means comprising a power driven wheel, a cam extending radially of said wheel and supported for rotation therewith, a yieldable trackway for said cam connected to said propelling means, a segmental gear on said wheel, and means connecting said segmental gear and said cutters, said cam and segmental gear being constructed and positioned to provide cooperative movement between said propelling and centering means and said cutters.

DAMAS FRENCH.